United States Patent
Janitch et al.

(10) Patent No.: US 7,102,584 B2
(45) Date of Patent: Sep. 5, 2006

(54) THROUGH AIR RADAR LEVEL TRANSMITTER

(75) Inventors: Paul G. Janitch, Lisle, IL (US); John S. Benway, Northbrook, IL (US); Stephen A. Reynolds, Downers Grove, IL (US); Stanislaw Bleszynski, Lakefield (CA)

(73) Assignee: Magnetrol International, Inc., Downers Grove, IL (US)

( * ) Notice: Subject to any disclaimer, the term of this patent is extended or adjusted under 35 U.S.C. 154(b) by 131 days.

(21) Appl. No.: 10/675,651

(22) Filed: Sep. 30, 2003

(65) Prior Publication Data

US 2004/0066348 A1 Apr. 8, 2004

Related U.S. Application Data

(60) Provisional application No. 60/414,847, filed on Sep. 30, 2002.

(51) Int. Cl.
*H01O 13/00* (2006.01)
(52) U.S. Cl. ............... 343/785; 343/786; 333/252; 333/254; 73/290 R
(58) Field of Classification Search ........ 343/785–786, 343/872, 753; 324/642–644, 637; 73/866.5, 73/204.22, 304 R, 431, 493, 290 R; 333/252, 333/254
See application file for complete search history.

(56) References Cited

U.S. PATENT DOCUMENTS

| 5,703,289 | A | | 12/1997 | Mulrooney |
| 5,880,698 | A | * | 3/1999 | Burger ..................... 343/772 |
| 5,943,294 | A | * | 8/1999 | Cherek et al. ............... 367/98 |
| 6,062,095 | A | * | 5/2000 | Mulrooney et al. ........ 73/866.5 |
| 6,202,485 | B1 | * | 3/2001 | Wien et al. ................ 73/290 R |
| 6,276,199 | B1 | * | 8/2001 | Eckert et al. .............. 73/290 V |
| 6,499,346 | B1 | * | 12/2002 | Wien et al. ................ 73/290 R |
| 6,642,807 | B1 | * | 11/2003 | Gard ........................ 333/24 R |
| 6,750,657 | B1 | * | 6/2004 | Griessbaum et al. ........ 324/642 |
| 6,750,808 | B1 | * | 6/2004 | Faust ........................ 342/124 |

* cited by examiner

*Primary Examiner*—Hoang V. Nguyen
*Assistant Examiner*—Chuc Tran
(74) *Attorney, Agent, or Firm*—Wood, Phillips, Katz, Clark & Mortimer

(57) ABSTRACT

A process control instrument comprises a control for generating or receiving a high frequency signal. A waveguide comprises a cylindrical housing closed at one end by a rear wall. A loop launcher is operatively connected to the control and comprises a wire having a first straight leg electrically connected at one end to the control and extending into the waveguide a first select length. A second straight leg is connected at one end to the rear wall and extends into the waveguide a second select length, greater than the first select length. A curved middle section connects the other ends of the first and second straight legs. An antenna is operatively coupled to the waveguide.

26 Claims, 5 Drawing Sheets

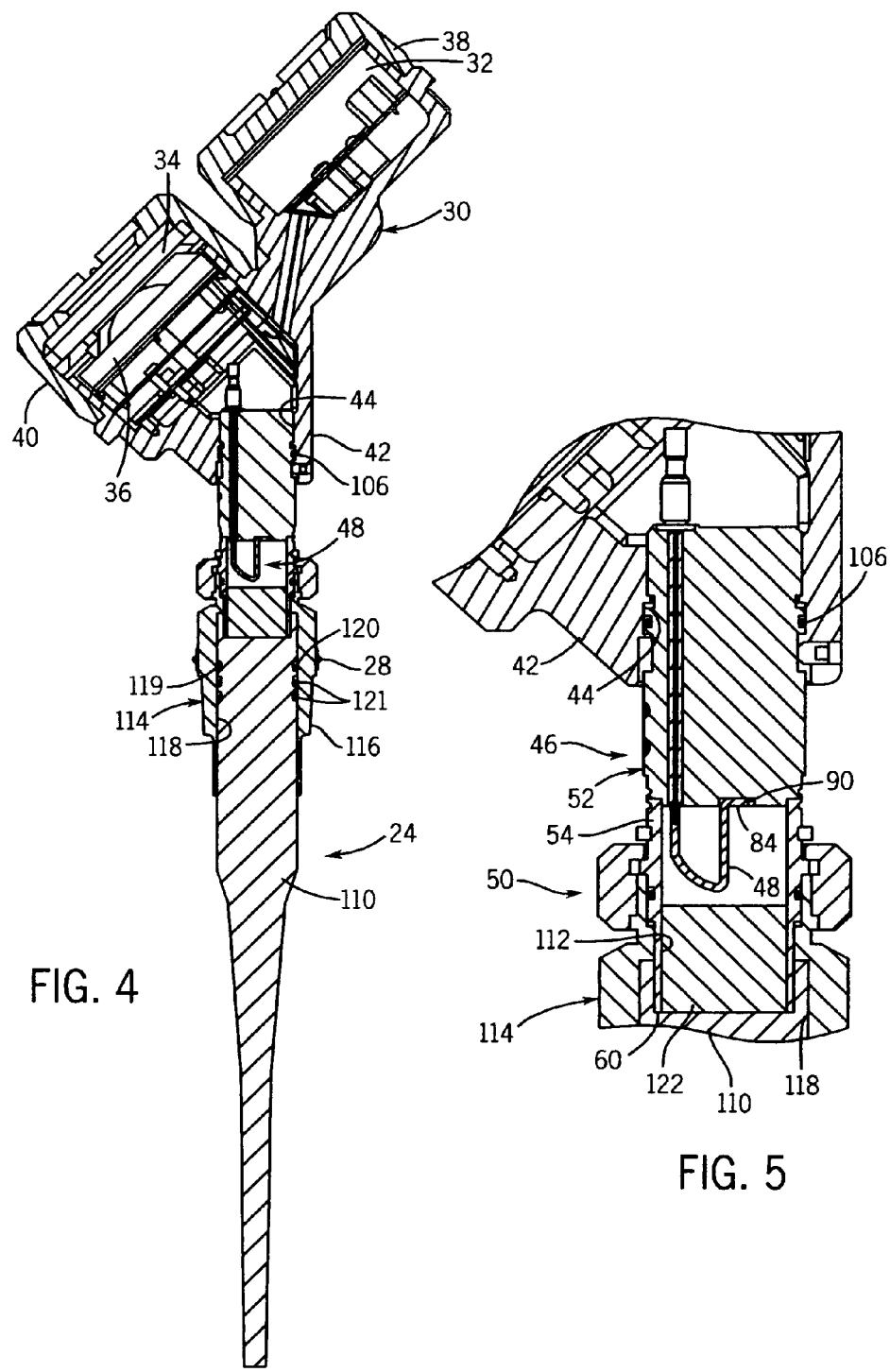

THROUGH AIR RADAR LEVEL TRANSMITTER

CROSS REFERENCE

This application claims priority of application No. 60/414,847 filed Sep. 30, 2002.

FIELD OF THE INVENTION

This invention relates to a process control instrument and more particularly, to a through air radar process control instrument.

BACKGROUND OF THE INVENTION

Industrial processes often require measuring the level of liquid or other material in a tank. Many technologies are used for level measurement. With contact level measurement some part of the system, such as a probe, must contact the material being measured. With non-contact level measurement the level is measured without contacting the material to be measured. One example is non-contact ultrasound, which uses high-frequency sonic waves to detect level. Another example is use of high-frequency or microwave RF energy. Microwave measurement for level generally uses either pulsed or frequency modulated continuous wave (FMCW) signals to make product level measurements. This method is often referred to as through air radar. Through air radar has the advantage that it is non-contact and relatively insensitive to measurement errors from varying process pressure and temperature. Known radar process control instruments operate at frequency bands of approximately 6 Ghz or 24 Ghz.

A through air radar measurement instrument must convert a high frequency electrical signal to an electromagnetic wave. A conventional device for accomplishing this is an exciter element or loop launcher housed in a waveguide. A loop launcher is a wire which couples energy from a coaxial feeder cable into the waveguide. Problems can occur in creating impedance matching between the coaxial cable and a required propagating mode, such as the TE11 mode. An antenna, such as a dielectric rod or horn, is operatively associated with the waveguide. An ultra-high frequency radiation beam is propagated downward from the antenna, and reflected off the surface of the material being measured to the antenna where the signal is received. The product level is calculated from the total time of propagation of the beam.

Typically, the antenna, waveguide and like components are provided as a unit and installed in a process vessel. If it is necessary to service the electronics, launcher or waveguide, then the device must be removed which disturbs the process seal. This can be problematic, particularly in hazardous process environments.

A difficulty can be encountered when a metal object is located in or around the radiated electromagnetic field. A reflection from a metal object can cause a false target situation, in which the system evaluates the product to be at a level indicated by the reflected signal from the object and not from the actual product. Typical false target objects in tanks are mixers, nozzles, ladders and tank walls. The radiated electromagnetic field distribution can be asymmetric about its centerline, and the pattern may vary along the direction of propagation. This phenomenon can be used as an advantage against false target detection. A signal level from a false target can vary as the antenna is rotated about its vertical axis. More specifically, the orientation of the loop launcher in the waveguide determines the sensitivity of the system to a false target. Optimization of the launcher position, as by rotating the device about the vertical axis, can minimize the effect of false targets.

The present invention is directed to overcoming one or more of the problems discussed above, in a novel and simple manner.

SUMMARY OF THE INVENTION

In accordance with the invention there is provided an improved through air radar process control instrument.

In accordance with one aspect of the invention, a process control instrument comprises a control for generating or receiving a high frequency signal. A waveguide comprises a cylindrical housing closed at one end by a rear wall. A loop launcher is operatively connected to the control and comprises a wire having a first straight leg electrically connected at one end to the control and extending into the waveguide a first select length. A second straight leg is connected at one end to the rear wall and extends into the waveguide a second select length, greater than the first select length. A curved middle section connects the other ends of the first and second straight legs. An antenna is operatively coupled to the waveguide.

It is a feature of the invention that the second leg is located at a center axis of the waveguide. The first leg is located off center in the waveguide.

It is another feature of the invention that the first select length is about a quarter of a wavelength.

It is a further feature of the invention that the waveguide has a length of about three-quarters wavelength.

It is another feature of the invention that the curved middle section has a radius of about 10 mm.

It is yet another feature of the invention that the loop launcher is asymmetrically placed entirely on one side of the axis of the waveguide.

It is still another feature of the invention that the first leg is parallel with the second leg.

It is still a further feature of the invention that the waveguide is filled with a dielectric material substantially surrounding the loop launcher.

It is an additional feature of the invention to provide a coupling cavity surrounding the waveguide for coupling the antenna to the waveguide. The coupling cavity may be formed of metal to define an intermediate waveguide.

There is disclosed in accordance with another aspect of the invention a process control instrument comprising a control for generating or receiving a high frequency signal. A waveguide comprises a cylindrical housing open at a distal end and closed at an inner end by a rear wall. A loop launcher is operatively connected to the control and comprises a wire electrically connected at one end to the control and extending into the waveguide and connected at another end to the rear wall. A coupling cavity comprises an open cylinder surrounding the waveguide and extending beyond the waveguide open end. An antenna is operatively coupled to the coupling cavity and the waveguide.

It is a feature of the invention that the coupling cavity extends beyond the waveguide open end a length of about one and three quarter wavelength.

It is another feature of the invention that the coupling cavity is of metal construction and comprises a process connection.

It is still a further feature of the invention to provide a union nut operatively secured to the waveguide for threading relative to the antenna at any angular orientation.

There is disclosed in accordance with still another aspect of the invention a process control instrument comprising a housing and a control in the housing for generating or receiving a high frequency signal. An antenna includes a coupling element for securing to a process vessel to define a process seal. A universal connector operatively connects the housing to the antenna and comprises a waveguide operatively secured to the housing. A loop launcher in the waveguide is operatively connected to the control. A union nut is operatively secured to the waveguide for selectively threading the waveguide to the antenna at any angular orientation without effecting the process seal.

It is a feature of the invention that the waveguide is rotatably mounted to the housing so that the housing and the loop launcher can be independently oriented relative to a process vessel.

It is another feature of the invention that the union nut is operatively secured to the waveguide with a snap ring.

It is another feature of the invention that the waveguide comprises a two piece assembly including a waveguide adapter operatively secured to the housing and a waveguide adapter tube extending from the waveguide adapter and defining the cylindrical housing so that the waveguide adapter defines the rear wall. A conductor may pass through the waveguide adapter for connecting the loop launcher to the control. The waveguide adapter tube may include an annular shoulder and the union nut is operatively secured to the waveguide adapter tube between the shoulder and a snap ring.

It is still a further feature of the invention that the loop launcher comprises an asymmetrical wire electrically connected at one end to the control and extending into the waveguide and connected at another end to a rear wall of the waveguide.

There is disclosed in accordance with yet another aspect of the invention a process control instrument comprising a housing and a control in the housing for generating or receiving a high frequency signal. A waveguide comprises a cylindrical housing closed at one end by a rear wall. A loop launcher is operatively connected to the control and comprises a wire electrically connected at one end to the control and extending into the waveguide and connected at another end to the rear wall to develop an asymmetrical radiated electromagnetic field. An antenna is operatively coupled to the waveguide. Means are provided for rotatably mounting the waveguide to the housing so that the housing and the loop launcher can be independently oriented relative to a process vessel.

It is a feature of the invention that the means for rotatably mounting the waveguide to the housing comprises a waveguide adapter defining the rear wall of the waveguide and having a thread received in a threaded opening of the housing. A set screw in the housing maintains the waveguide adapter in a desired rotational position.

Further features and advantages of the invention will be readily apparent from the specification and from the drawings.

BRIEF DESCRIPTION OF THE DRAWINGS

FIG. 4 is a sectional view of the process control instrument of FIG. 1;

FIG. 5 is a cut-away enlarged sectional view of the process control instrument of FIG. 1;

DETAILED DESCRIPTION OF THE INVENTION

Figures 1, 2:
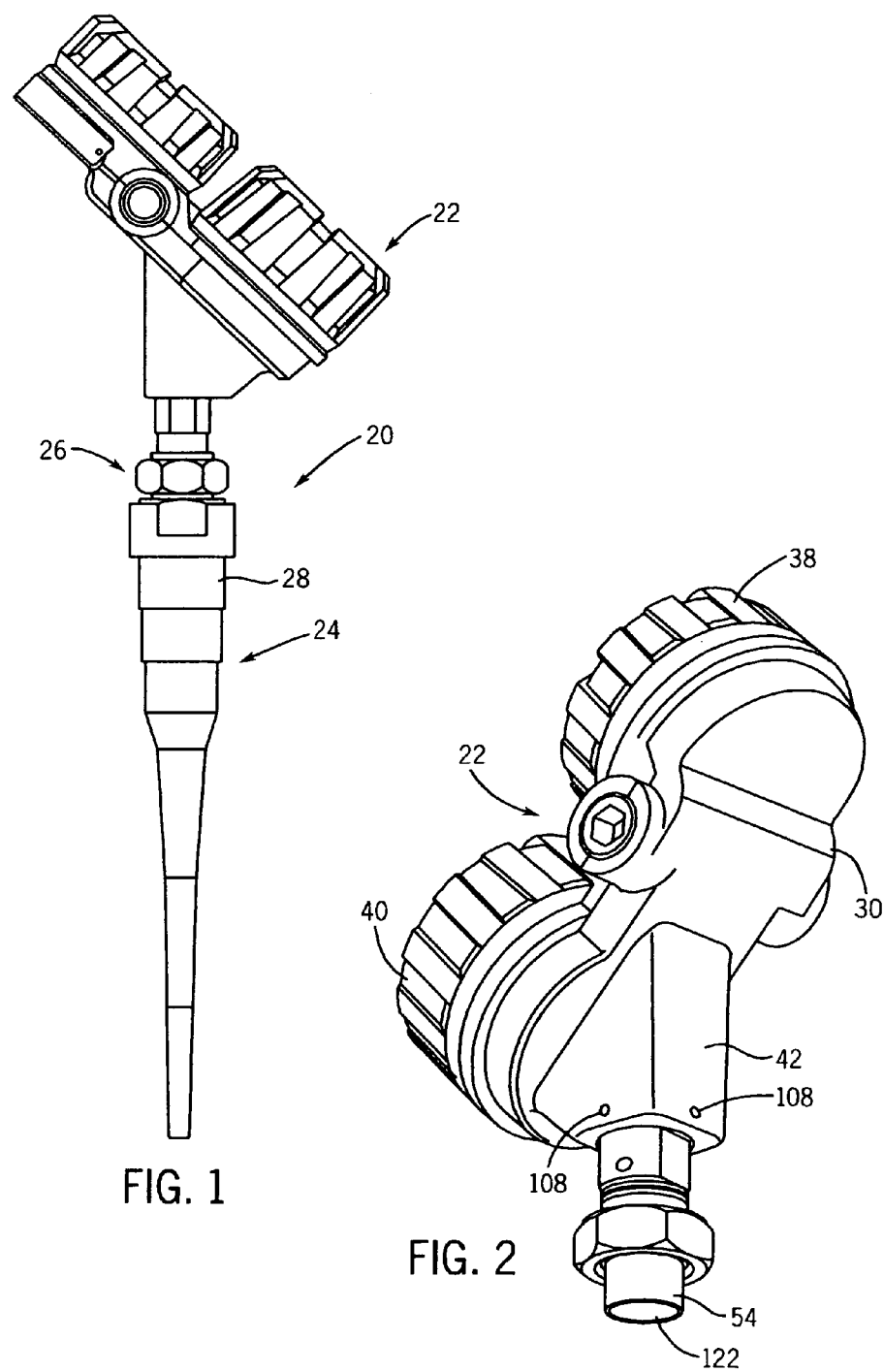
FIG. 1 is a plan view of a process control instrument in accordance with the invention.
FIG. 2 is a rear, lower perspective view of the process control instrument of FIG. 1 with the antenna removed.

Referring to FIG. 1, a process control instrument 20 according to the invention is illustrated. The process control instrument 20 uses micro power impulse radar (MIR) in conjunction with equivalent time sampling (ETS) and ultra-wideband (UWB) transceivers for measuring a level using time domain reflectometry (TDR). Particularly, the instrument 20 uses through air radar for sensing level. While the embodiments described herein relate to an MIR level sensing apparatus, various aspects of the invention may be used with other types of process control instruments for measuring various process parameters, as will be apparent to those skilled in the art.

The process control instrument 20 includes a control housing 22, an antenna 24 and a universal connector 26 for connecting the antenna 24 to the housing 22. The antenna 24 is typically mounted to a process vessel V, see also FIG. 10, using a threaded fitting 28. Alternatively, a flange may be used. The housing 22 is then secured to the antenna 24 as by threading the connector 26 to the antenna 24 and to the housing 22. The housing 22 may be as generally described in Mulrooney et al., U.S. Pat. No. 6,062,095, the specification of which is hereby incorporated by reference herein.

The instrument 20 uses pulse-burst radar technology with ETS circuitry. Short bursts of 5.8 or 6.3 GHz microwave energy are emitted and subsequently reflected from a liquid level surface. The distance is calculated by the equation $$D = (\text{velocity of } EM \text{ propagation}) * \text{transit time(round trip)}/2.$$

Liquid level is then calculated by applying a tank height value. ETS is used to measure the high speed, low power electromagnetic (EM) energy. The high speed EM energy (1,000 ft/µs) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round trip event on a 65 ft. tank takes only 133 nanoseconds in real time. After it is reconstructed in equivalent time it measures 200 milliseconds.

Figure 3:
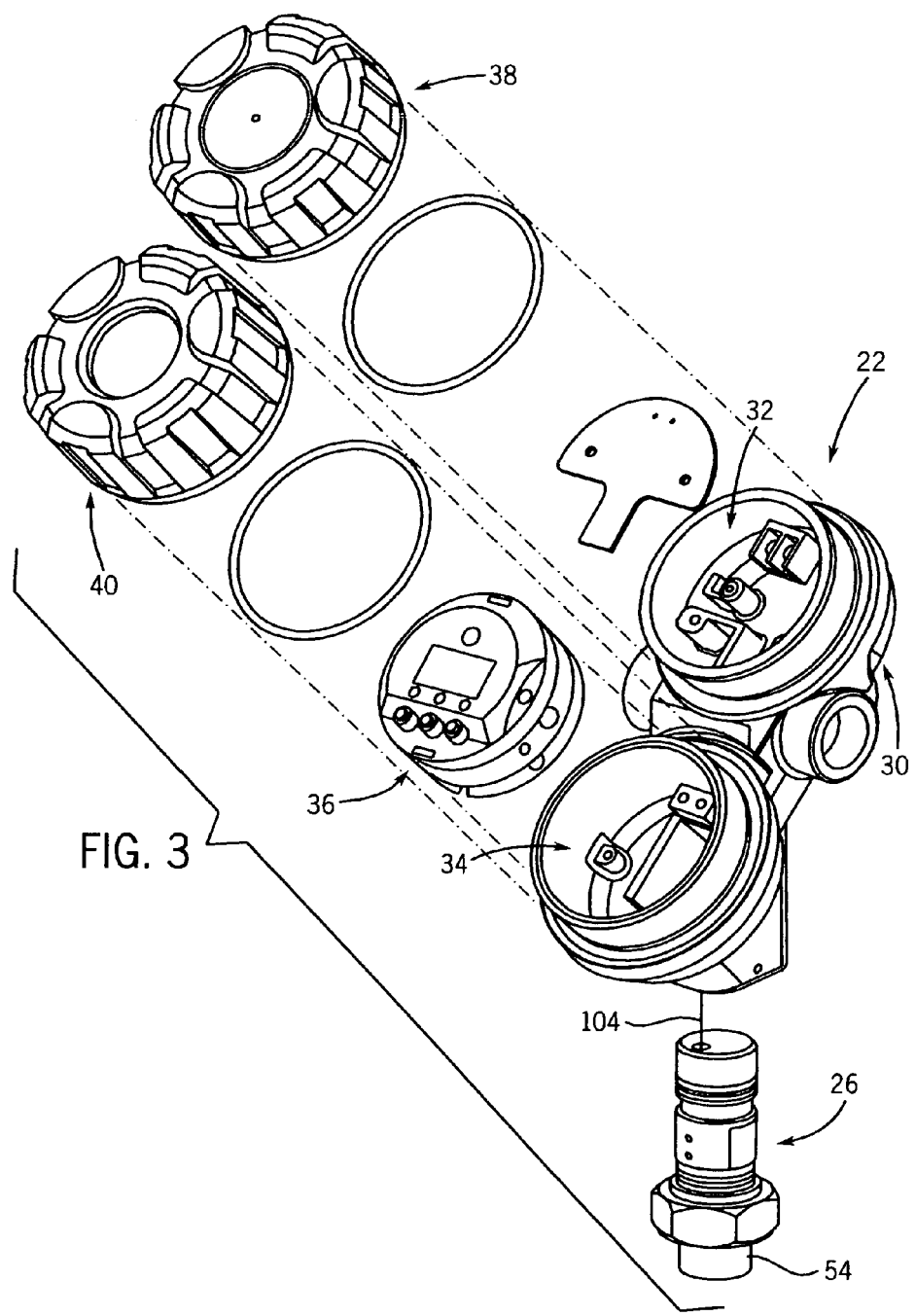
FIG. 3 is an exploded view of the process control instrument of FIG. 2.

Referring also to FIGS. 2 and 3, the housing 22 includes a base 30 having a wiring compartment 32 and an electronics compartment 34. The electronics compartment 34 receives a control module 36 including a control circuit for generating or receiving a high frequency signal. A first cover 38 selectively closes the wiring compartment 32. A second cover 40 selectively closes the electronics compartment 34. A collar 42 extends downwardly at about a 45° angle from the base 30 and includes a threaded cylindrical through opening 44, see FIG. 4, for receiving the connector 26.

Figure 6:
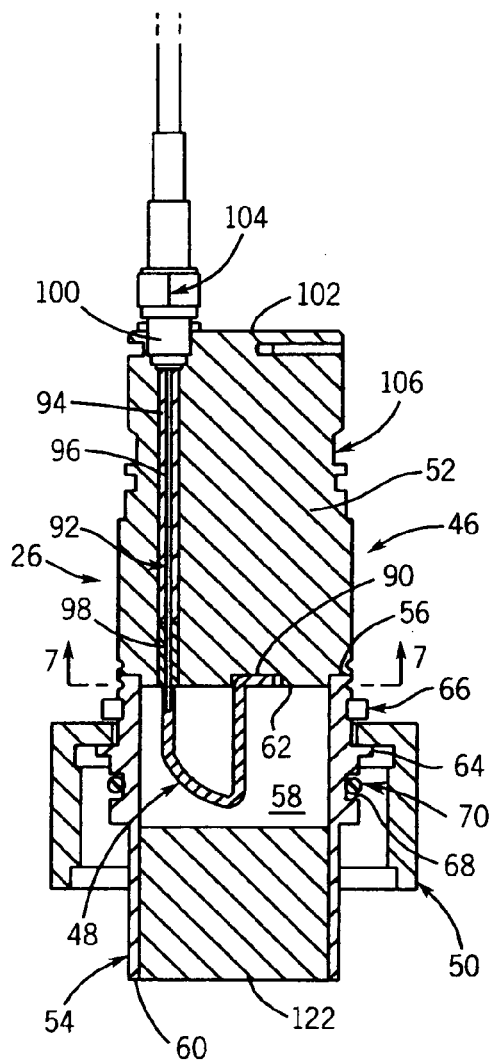
FIG. 6 is a sectional view of a waveguide and loop launcher of the process control instrument of FIG. 1.

Referring to FIG. 6, the connector 26 is illustrated in greater detail. The connector 26 comprises a universal connector including a waveguide 46, a loop launcher 48 and a union nut 50. The waveguide 46 comprises a two piece assembly including a waveguide adapter 52 and a waveguide adapter tube 54 secured thereto as by welding or brazing as at 56. The waveguide adapter tube 54 defines a cylindrical housing 58, also referred to herein as a launching cavity, open at a distal end 60 and closed at an inner end by a rear wall 62 provided by the waveguide adapter 52. The adapter tube 54 includes an outwardly extending radial shoulder 64. The union nut 50 is received on the shoulder 64 and is retained thereon with a conventional snap ring 66. A radially outwardly opening groove 68 outwardly from the shoulder 64 receives an O-ring 70. In the illustrated embodiment of the invention, the waveguide adapter 52 and the waveguide adapter tube 54 are formed of a conductive metal, such as stainless steel.

The loop launcher 48 comprises a wire 72 of, for example, stainless steel. The wire 72 has a first straight leg 74 having a first end 76 with a drilled hole 78 and a second end 80. The length of the first leg 74 is approximately one quarter of the waveguide wavelength and the clearance distance from the wall of the tube 54 is adjusted for the optimum impedance matching to the coaxial feeder. A second leg 82 has a turned first end 84 and a second end 86. The second leg 82 is longer than the first leg 74. The length of the second leg 82 is adjusted for the optimal coupling between the loop launcher 48 and the launching cavity 58 such as to minimize the overall standing wave ratio. A curved middle section 88 is connected between the second ends 80 and 86. The middle section 88 comprises a circular arc having a radius of about 10 mm. The wire 72 may have a diameter on the order of 0.060 inches.

The loop launcher wire 72 is mounted to the waveguide rear wall 62 in the cylindrical housing 58. Particularly, the second leg turned first end 84 is received in a well 90. The well 90 is located so that the second leg 82 is at a center axis of the waveguide 46. The first leg first end 76 is electrically connected to a center conductor 92 surrounded by a plastic insulator 94 extending through an opening 96 in the waveguide adapter 52. An explosion proof seal 98 is provided around the center conductor 92 at its entry to the cylindrical housing 58. The center conductor 92 extends into the wire drilled hole 78. This construction provides a coaxial connection.

A connector 100 is mounted to an inner end 102 of the adapter 52 and is connected to the center conductor 96 and the adapter 52. A coaxial cable assembly 104 is connected to the connector 100 for connection to the control module 36, and particularly to a conventional control circuit of the control module.

The waveguide adapter 52 includes external threads 106 for being threadably received in the threaded collar opening 44, see FIG. 4. Set screws 108, see FIG. 2, lock the connector 26 in a desired rotational position.

The antenna 24 comprises a dielectric rod 110 having a counterbore 112 at an upper end sized to receive the waveguide adapter tube 54. A coupling element 114 comprises a cylindrical metal open ended structure 116 of inner diameter larger than the outer diameter of the adapter tube 54 defining a coupling cavity 118. The diameter of the coupling cavity 118 is adjusted (for example 1.3–1.5 inch) depending on the dielectric material within, such as to minimize the reflection from the farther end of the coupling cavity. In order to minimize strength of the fringe near field and the side lobe emission from the antenna, the optimal length of the coupling cavity measured from the end of the launching cavity to the end of the coupling cavity, see FIG. 4, should be an odd multiple of the Quarter Waveguide-Wavelength (QWW) and not smaller than 7 times the QWW. An outer wall of the coupling element 114 includes the threaded fitting 28. An opposite inner surface includes a groove 120 for attaching to a top end of the dielectric rod 110 using a snap ring 119. O rings 121 are also used.

Figure 7:
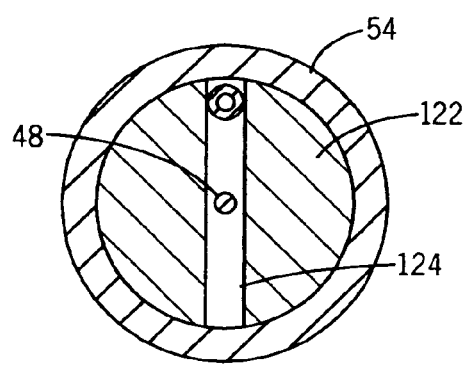
FIG. 7 is a sectional view taken along the line 7—7 of FIG. 6.

A dielectric insert 122 is generally cylindrical including a slot 124. The insert 122 is received in the waveguide adapter tube 54 with the loop launcher 48 captured in the slot 124, see FIG. 7. As such, the dielectric insert fills the waveguide tube 54 substantially surrounding the loop launcher 48.

Figure 10:
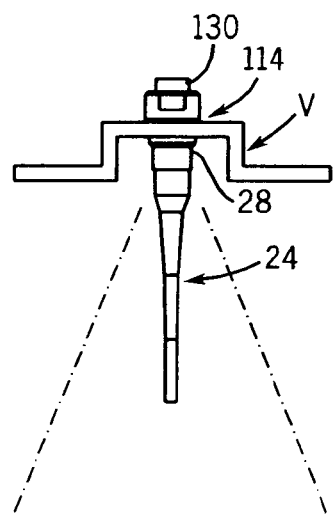
FIG. 10 is a side view of the dielectric rod antenna of the process control instrument of FIG. 1 mounted on a vessel.

In use, the antenna 24 is mounted to the process vessel V, as shown in FIG. 10. As such, the antenna 24 provides a process seal. The universal connector 26 can be installed on the antenna 24 at a later time. Particularly, the universal connector 26 is installed by inserting the tube 54 within the antenna counterbore 112, as shown in FIG. 5. The union nut 50 is then threaded onto a threaded end 130, see FIG. 10, of the coupling element 114. Subsequently, the universal connector 26 can be removed at any time. This allows a user to perform maintenance, set up, or calibration on the instrument 20 at another location.

The connection between the universal connector 26 and the housing 30 provides a swivel connection between the waveguide 46 and the electronics enclosure 34. The swivel connection allowed by the universal connector allows greater than 180° of rotation of the waveguide 46. As such, the antenna waveguide 46 with its associated loop launcher 48 can be rotated about a vertical axis independently of the antenna 24 and its process connection, and also of the electronics enclosure 34. The position of the loop launcher 48 can be optimized without rotating the integral housing 22 which can be completely wired and powered on while performing the orientation optimization. In addition, a display on the control module 36 can remain stationary, and face any desired direction.

Figure 11:
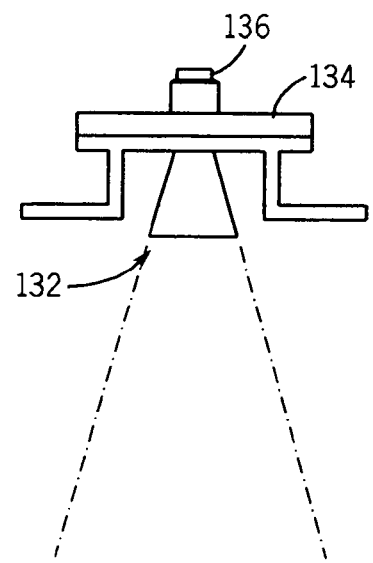
FIG. 11 is a view similar to FIG. 10, illustrating a horn antenna.

The orientation of the loop launcher 48 is continuous and independent of the process connection. A flanged antenna, such as a horn antenna 132, see FIG. 11, including a flange 134, can only be rotated in a limited number of fixed positions determined by the bolt pattern on the flange 134. The horn antenna 132 includes a threaded connection 136 for connecting to the universal connector 26 in the same manner discussed above with respect to the dielectric rod antenna 24.

The dielectric rod 110 may be of any conventional material, such as PTFE, PVDF or polypropylene. The dielectric rod antenna 24 is configured using a TE11 dominant propagating mode. The purpose of the dielectric rod antenna 24 is to guide the propagating electrical magnetic wave along a path beginning inside the launching cavity, defined by the cylindrical housing 58, and extending into the air where the electromagnetic energy would eventually leave the dielectric and propagate in the free space, in the original direction along the axis of the dielectric rod 110.

The coupling cavity 118 entirely encloses the launching cavity 58, as well as the bottom wider part of the dielectric rod 110. The coupling cavity 118 extends beyond the waveguide open end 60, as shown in FIGS. 4 and 5 in a range of about 7, 9, 11, etc. times the QWW, which facilitates matching of the electromagnetic mode propagating out of the launching cavity 58 into the dielectric rod 110. It also suppresses the off axial side lobe radiation pattern by shielding the fringe radiation generated by the open edge 60 of the launching cavity 58.

Figure 8:
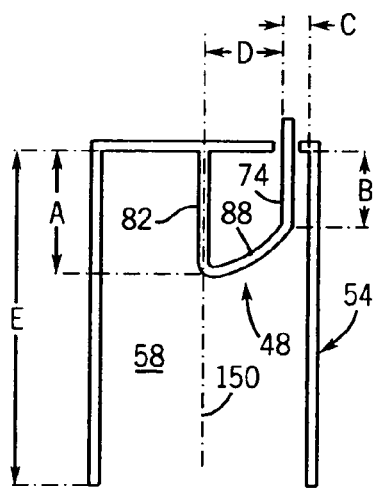
FIG. 8 is a schematic illustration of the relationship of the loop launcher to the waveguide of the process control instrument of FIG. 1.
Figure 9:
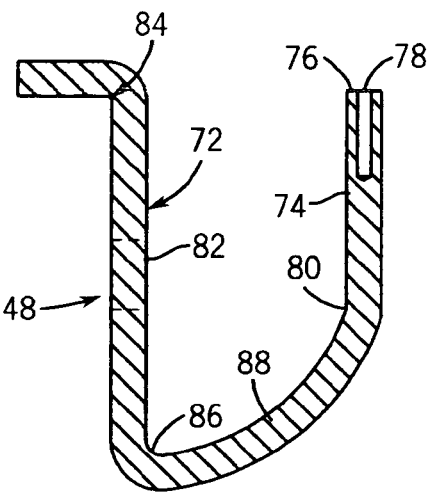
FIG. 9 is a sectional view of a loop launcher in accordance with the invention.

As described, the launching cavity 58 is filled with a dielectric material by the insert 122 of the same characteristics as the rod antenna 110. The inner diameter of the cavity 58 is chosen such that the waveguide cut-off frequency for the TE11 mode is about 20% lower (4.8 GHz) than the lowest center frequency of the desired operating band (5.8 GHz). The length E of the launching cavity 58, see FIG. 8, is equal to three times the quarter axial wavelength of the TE11 dominant propagating mode. The launching cavity 58 presents a resonating system tuned best to the desired frequency band and to the required propagating mode, which at the same time acts as a filter as well as plays the role of the optimal matching device coupling energy from the coaxial feeder and the loop launcher 48 on one end and the dielectric rod 110 on the other end.

The precise dimensions and shape of the loop launcher 48 are adjusted and optimized specifically to maximize the 50 ohm coaxial cable coupling at the desired frequency band and minimize the unwanted out of band frequency coupling as well as uncoupled from the "parasitic" TM01 cavity mode.

The first straight leg 74 extends into the launching cavity 58 in length about 10 mm and placed off center and aligned along the center axis, represented by a dashed line 150. The second leg 82 is longer than the first leg 74 and is placed on the axis of symmetry represented by the line 150.

The first leg 74 of the launcher 48 is propagating in a "quasi" coaxial mode. It is no longer coaxial configuration because the conductor is parallel to a cavity wall rather than in the center of a shield, and it is not yet a circular waveguide mode. The actual value of that quarter-wavelength quasi coaxial mode is in-between the true coaxial cable quarter-wavelength of about 8.6 mm (at 6.0 GHz) and the waveguide quarter-wavelength inside the launching cavity of about 14.3 mm (at 6.0 GHz). The quarter wavelength of the quasi coaxial mode was determined experimentally to be about 10 mm.

In a typical implementation for the nominal frequency of 6 GHz, and with reference to FIG. 8, the cavity length E would be on the order of 42 mm, the cavity diameter 25 mm, the loop wire diameter 1.5 mm, the dimension A=16 mm, B=10 mm, C=2.55 mm and D=10 mm. Alignment of the second leg 82 and placement on the axis of symmetry is essential for the optimum exclusion of the unwanted modes and minimization of out of band coupling, while its length determines the optimum mode coupling strength. The existence of the straight quarter wavelength first leg 74 placed off center along the main axis at a specific clearance C from the wall achieves the optimum impedance matching to the coaxial cable 104. The middle section 88 of the loop plays an important role in coupling of the energy from the loop 48 into the TE11 mode propagating forward in the launching cavity 58 in the most efficient manner. Making the middle section 88 curved reduces a discontinuity between it and the first leg 74.

Thus, in accordance with the invention, there is provided an improved through air radar level process control instrument.

We claim:

1. A process control instrument comprising:
   a control for generating or receiving a high frequency signal;
   a waveguide comprising a cylindrical housing closed at one end by a rear wall;
   a loop launcher operatively connected to the control and comprising a wire having a first straight leg electrically connected at one end to the control and extending into the waveguide a first select length, a second straight leg connected at one end to the rear wall and extending into the waveguide a second select length, greater than the first select length, and a curved middle section connecting other ends of the first and second straight legs; and
   an antenna operatively coupled to the waveguide.

2. The process control instrument of claim 1 wherein the second leg is located at a center axis of the waveguide.

3. The process control instrument of claim 1 wherein the first leg is located off center in the waveguide.

4. The process control instrument of claim 1 wherein the first select length is about a quarter wavelength.

5. The process control instrument of claim 1 wherein the waveguide has a length of about three-quarter waveguide wavelength.

6. The process control instrument of claim 1 wherein the curved middle section has a radius of about 10 mm.

7. The process control instrument of claim 1 wherein the loop launcher is asymmetrically placed entirely on one side of an axis of the waveguide.

8. The process control instrument of claim 1 wherein the first leg is parallel with the second leg.

9. The process control instrument of claim 1 wherein the waveguide is filled with a dielectric material substantially surrounding the loop launcher.

10. The process control instrument of claim 1 further comprising a coupling cavity surrounding the waveguide for coupling the antenna to the waveguide.

11. The process control instrument of claim 10 wherein the coupling cavity is formed of metal to define an intermediate waveguide.

12. A process control instrument comprising:
   a control for generating or receiving a high frequency signal;
   a waveguide comprising a cylindrical housing open at a distal end and closed at an inner end by a rear wall;
   a loop launcher operatively connected to the control and comprising a wire electrically connected at one end to the control and extending into the waveguide and connected at another end to the rear wall;
   a coupling cavity comprising an open cylinder surrounding the waveguide and extending beyond the waveguide open end; and
   an antenna operatively coupled to the coupling cavity and the waveguide.

13. The process control instrument of claim 12 wherein the coupling cavity extends beyond the waveguide open end a length in a range of about 7, 9, 11 or higher odd multiples of quarter waveguide wavelength.

14. The process control instrument of claim 12 wherein the coupling cavity is of metal construction.

15. The process control instrument of claim 14 wherein the coupling cavity comprises a process connection.

16. The process control instrument of claim 12 wherein the loop launcher comprises a wire having a first straight leg electrically connected at one end to the control and extending into the waveguide a first select length, a second straight leg connected at one end to the rear wall and extending into the waveguide a second select length, greater than the first select length, and a curved middle section connecting other ends of the first and second straight legs.

17. The process control instrument of claim 12 further comprising a union nut operatively secured to the waveguide for threading relative to the antenna at any angular orientation.

18. A process control instrument comprising:
a housing;
a control in the housing for generating or receiving a high frequency signal;
a waveguide comprising a cylindrical housing closed at one end by a rear wall;
a loop launcher operatively connected to the control and comprising a wire electrically connected at one end to the control and extending into the waveguide and connected at another end to the rear wall to develop an asymmetrical radiated electromagnetic field;
an antenna operatively coupled to the waveguide; and
means for rotatably mounting the waveguide to the housing so that the housing and the loop launcher can be independently oriented relative to a process vessel.

19. The process control instrument of claim 18 wherein the means for rotatably mounting the waveguide to the housing comprises a waveguide adapter defining the rear wall of the waveguide and having a thread received in a threaded opening of the housing.

20. The process control instrument of claim 19 wherein a set screw in the housing maintains the waveguide adapter in a desired rotational position.

21. The process control instrument of claim 18 wherein the waveguide comprise a two piece assembly including a waveguide adapter operatively secured to the housing and a waveguide adapter tube extending from the waveguide adapter and defining the cylindrical housing so that the waveguide adapter defines the rear wall.

22. The process control instrument of claim 21 further comprising a conductor passing through the waveguide adapter for connecting the loop launcher to the control.

23. The process control instrument of claim 18 further comprising a union nut operatively secured to the waveguide for threading relative to the antenna at any angular orientation so that the housing and the loop launcher can be independently oriented relative to the process vessel.

24. The process control instrument of claim 23 wherein the waveguide adapter tube includes an annular shoulder and the union nut is operatively secured to the waveguide adapter tube between the shoulder and a snap ring.

25. The process control instrument of claim 18 wherein the loop launcher comprises an asymmetrical wire.

26. The process control instrument of claim 18 wherein the loop launcher comprises a wire having a first straight leg electrically connected at one end to the control and extending into the waveguide a first select length, a second straight leg connected at one end to the rear wall and extending into the waveguide a second select length, greater than the first select length, and a curved middle section connecting other ends of the first and second straight legs.

* * * * *